United States Patent [19]
Gardner et al.

[11] 4,174,177
[45] Nov. 13, 1979

[54] FALSE TARGET WARNING SYSTEM

[75] Inventors: Keith L. Gardner, Tucson, Ariz.; Goro Fujiwara, Ridgecrest, Calif.

[73] Assignee: The United States of America as represented by the Secretary of the Navy, Washington, D.C.

[21] Appl. No.: 933,300

[22] Filed: Aug. 14, 1978

[51] Int. Cl.² ........................... G01C 3/08; F41G 7/00
[52] U.S. Cl. ...................................... 356/5; 244/3.16; 250/214 AG; 250/214 B
[58] Field of Search ................. 356/4, 5; 244/3.16; 343/5 SM; 250/214 B, 214 AG

[56] References Cited
U.S. PATENT DOCUMENTS

| 3,305,859 | 2/1967 | Schwartz | 343/5 SM |
| 3,556,657 | 1/1971 | Quelle, Jr. | 356/4 |
| 3,654,477 | 4/1972 | Benjamin, Jr. | 356/5 |
| 3,743,216 | 7/1963 | Salonimer | 244/3.16 |
| 3,782,824 | 1/1974 | Stoliar et al. | 356/103 |
| 3,848,999 | 11/1974 | Dall'Armi | 356/4 |
| 4,091,412 | 5/1978 | Salonimer | 356/5 |

Primary Examiner—S. C. Buczinski
Attorney, Agent, or Firm—R. S. Sciascia; W. Thom Skeer; John H. Lynn

[57] ABSTRACT

A system for warning a target designator operator whenever a target less than a predetermined distance from the operator is designated. Actuating the target designator triggers a time interval counter and circuitry to detect reflected pulses. An indicator will warn the operator if a pulse is reflected to the system from an object less than a predetermined distance from the operator.

8 Claims, 3 Drawing Figures

FALSE TARGET WARNING SYSTEM

BACKGROUND OF THE INVENTION

1. Field of the Invention

This invention relates generally to range-finding and target designation systems, and more particularly, to laser target designators for laser guided weapons.

2. Description of the Prior Art

In laser guided weapons systems a target designator sends pulses of laser energy to the target, and a seeker attached to the weapon uses reflected energy from the target to guide the weapon to the target. Proper target designation depends upon the maintenance of a clear line of sight between the target designator and the target. Obstructions in the path of the designator beam may scatter part or all of the beam and may make it impossible for the seeker to discriminate between the desired target and the obstructions. Thus, the laser guided weapon not only could miss the intended target, but also could hit a false target dangerously close to the target designator operator. Target designator operator safety has relied upon operator training and seeker design, both of which have limitations in battlefield situations.

SUMMARY OF THE INVENTION

Actuation of the target designator simultaneously sends a pulse of laser energy toward the target and triggers a time interval counter and a sensitivity control circuit. Reflected energy from the laser is sensed by the false target warning system. The reflected energy is optically collected, filtered and focused on a detector. The detector generates an electrical signal to an amplifier connected to a threshold circuit which has its threshold level decreased with time by the sensitivity control circuit. Any signal from the amplifier greater than the threshold level will be sent to the time interval counter; and if the time between triggering the time interval counter and receipt of the reflected pulse is less than the time required for a designator pulse to travel a predetermined distance and reflect back to the detector, an indicator will warn the operator.

DESCRIPTION OF THE PREFERRED EMBODIMENT

Figure 1:
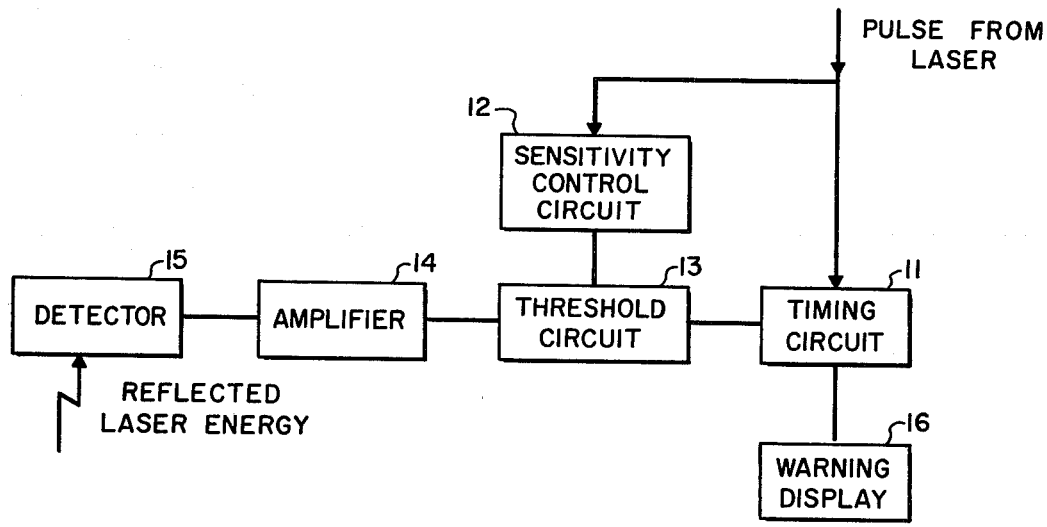
FIG. 1 is a block diagram of the invention.

Referring to FIG. 1, a pulse of energy from a target designator, not shown, simultaneously triggers a time interval counter 11 and a sensitivity control circuit 12. A threshold circuit 13 has its output connected to time interval counter 11. Sensitivity control circuit 12 causes the threshold level of threshold circuit 13 to decrease as the time interval from receipt of the triggering pulse increases. The output of an amplifier 14 is connected to threshold circuit 13, and the input of amplifier 14 is connected to the output of a detector 15.

The target designator emits pulses of electromagnetic energy which, in the usual embodiment, come from an infrared laser. If this energy illuminates an object and reflects back to detector 15, then a signal is sent to amplifier 14. If the output of amplifier 14 is greater than the threshold level, then threshold circuit 13 sends a signal to time interval counter 11. If the elapsed time from triggering to receipt of the signal from threshold circuit 13 is less than a predetermined interval, then time interval counter 11 will actuate an indicator 16 to warn the target designator operator that a target is being designated that is dangerously close to the operator.

Figure 2:
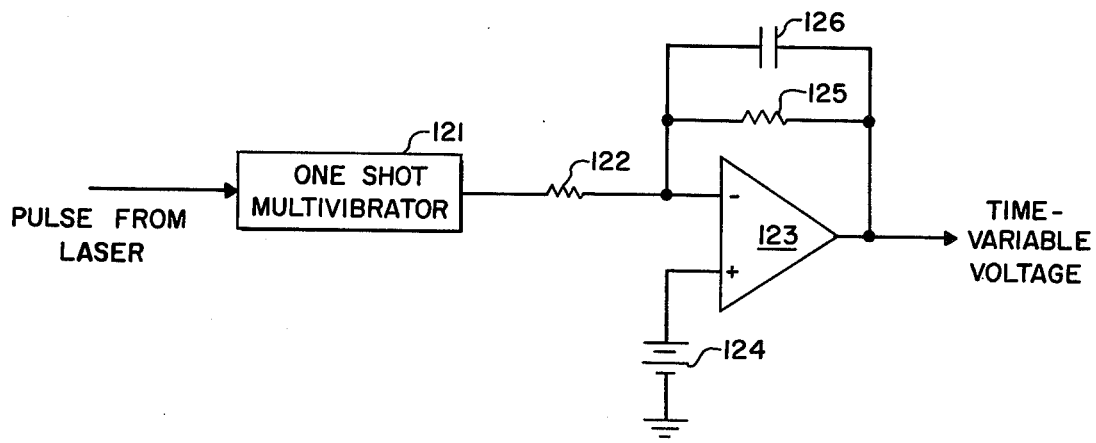
FIG. 2 is a circuit diagram for the sensitivity control circuit.

FIG. 2 shows the structure of sensitivity control circuit 12. A one shot multivibrator 121 receives the triggering pulse from the target designator and provides a voltage of fixed duration to an integrator formed by resistors 122 and 125, an operational amplifier 123, and a capacitor 126. A positive voltage source 124 provides the necessary voltage to offset threshold circuit 13.

A voltage that decreases with time is generated by sensitivity control circuit 12 and supplied to threshold circuit 13. The amplitude of the reflected energy to detector 15 decreases roughly as the inverse square of the distance between the point of reflection and detector 15. The time-varying threshold level will, therefore, handle relatively large amplitude reflected pulses that arrive at detector 15 in a very short time after triggering and still allow the system to be sensitive enough to respond to smaller amplitude arriving at later times.

Figure 3:
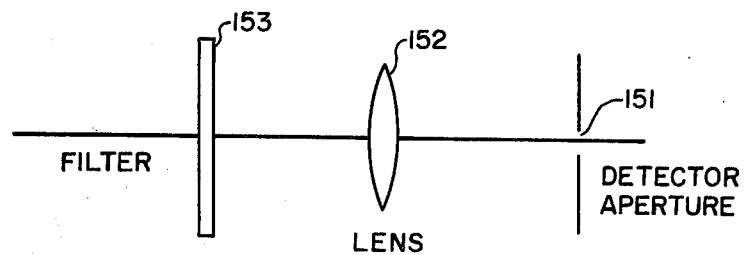
FIG. 3 illustrates an arrangement of optical components for directing reflected pulses to the detector.

FIG. 3 illustrates a modification of the embodiment shown in FIG. 1. Detector 15 has an aperture 151 which defines a path of optical transmission. A converging lens 152 is situated in the path of optical transmission at a distance from detector 15 equal to the focal length of lens 152. A filter 153 is placed in the path of optical transmission so that only electromagnetic energy of the laser designator wavelength is passed to aperture 151. The optical system is shown as if it were on a bench. However, it is recognized that it is possible to fold the path of optical transmission using various components; and the claims are not intended to be limited to the specific arrangement shown in FIG. 3.

What is claimed is:

1. A false target warning system for a target designator, comprising:

detector means for detecting electromagnetic energy from the target designator that is reflected back thereto and which defines a path of optical transmission;

an amplifier connected to the output of said detector means;

a threshold circuit having first and second inputs, said first input connected to the output of said amplifier, said threshold circuit configured to have a signal output whenever the signal applied to said first input exceeds the threshold level;

a sensitivity control circuit for controlling the threshold level of said threshold circuit, comprising: an integrator having the output thereof connected to said second input of said threshold circuit;

a one-shot multivibrator connected to the negative input of said integrator, said one-shot multivibrator configured to be triggered by a pulse of energy from the target detector;

a source of positive voltage connected to the positive input of said integrator, the integrator output being equal to said positive voltage minus the integrated signal from said one-shot multivibrator, thereby supplying a voltage that decreases with time to said second threshold input to cause the threshold level of said threshold circuit to decrease with time;

a timing circuit triggered by pulses of energy from the target designator, connected to the output of said threshold circuit and configured to be triggered simultaneously with said one-shot multivibrator; and indicator means, connected to said timing means, for warning the operator of the target designator whenever said timing circuit receives a signal from said threshold circuit in a time less than a predetermined interval.

2. A false target warning system for a target designator according to claim 1 further comprising a filter in the path of the optical transmission for passing electromagnetic energy of wave length equal to the wave length of the output of the target designator to said detector means.

3. A false target warning system for a target designator according to claim 1 further including a converging lens in the path of optical transmission.

4. A false target warning system for a target designator according to claim 1 further comprising:

a filter in the path of optical transmission for passing electromagnetic energy of wave length equal to the wave length of the output of the target designator to said detector means; and a converging lens in the path of optical transmission.

5. A false target warning system for a target designator according to claim 1 wherein said electromagnetic energy from the target designator is a coherent electromagnetic wave.

6. A false target warning system for a target designator according to claim 5 further comprising a filter in said path of optical transmission for passing electromagnetic energy of wave length equal to the wave length of the output of the target detector to said detector means.

7. A false target warning system for a target designator according to claim 5 further including a converging lens in the path of optical transmission.

8. A false target warning system for a target designator according to claim 5 further comprising;

a filter in the path of optical transmission for passing electromagnetic energy of wave length equal to the wave length of the output of the target detector said detector means; and a converging lens in the path of optical transmission.

* * * * *